(12) United States Patent
Tateishi

(10) Patent No.: US 10,792,765 B2
(45) Date of Patent: Oct. 6, 2020

(54) METHOD FOR FORMING CLADDING LAYER AND FORMING APPARATUS

(71) Applicant: TOYOTA JIDOSHA KABUSHIKI KAISHA, Toyota-shi (JP)

(72) Inventor: Hiroki Tateishi, Toyota (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 331 days.

(21) Appl. No.: 15/859,907

(22) Filed: Jan. 2, 2018

(65) Prior Publication Data
US 2018/0236606 A1    Aug. 23, 2018

(30) Foreign Application Priority Data

Feb. 23, 2017  (JP) .................................. 2017-032064

(51) Int. Cl.
| | |
|---|---|
| *B23K 26/03* | (2006.01) |
| *B23K 26/342* | (2014.01) |
| *B23K 26/08* | (2014.01) |
| *B23K 26/34* | (2014.01) |
| *B23K 26/06* | (2014.01) |

(52) U.S. Cl.
CPC ........ *B23K 26/342* (2015.10); *B23K 26/0626* (2013.01); *B23K 26/0853* (2013.01); *B23K 26/34* (2013.01)

(58) Field of Classification Search
CPC .................................................. B23K 26/342
USPC ........................................ 219/121.64, 121.84
See application file for complete search history.

(56) References Cited

U.S. PATENT DOCUMENTS

2015/0191316 A1* 7/2015 Sato ...................... B23K 26/00
                                                            406/122
2015/0328718 A1   11/2015 Iwatani et al.

FOREIGN PATENT DOCUMENTS

| JP | 11-302701 | 11/1999 |
| JP | 2015-217397 | 12/2015 |

OTHER PUBLICATIONS

Kimio Kawakita, et al. "Introduction to Powder Technology", Plant Engineering Company, 1969, 12 pages.

* cited by examiner

*Primary Examiner* — Lauren A Crane
(74) *Attorney, Agent, or Firm* — Oblon, McClelland, Maier & Neustadt, L.L.P.

(57) ABSTRACT

Variations in the quality of starting end parts of cladding layers are reduced. An aspect of the present disclosure is a method for forming a cladding layer in which a cladding layer is formed by starting to supply a metal powder onto a base material by changing a supply instruction to an on-state, and irradiating the metal powder with a laser beam according to a laser output pattern corresponding to the supply instruction. The method includes, before forming the cladding layer, acquiring a fluidity of the metal powder, and changing the laser output pattern according to the acquired fluidity.

10 Claims, 9 Drawing Sheets

METHOD FOR FORMING CLADDING LAYER AND FORMING APPARATUS

CROSS REFERENCE TO RELATED APPLICATIONS

This application is based upon and claims the benefit of priority from Japanese patent application No. 2017-032064, filed on Feb. 23, 2017, the disclosure of which is incorporated herein in its entirety by reference.

BACKGROUND

The present disclosure relates to a method for forming a cladding layer and a forming apparatus. In particular, the present disclosure relates to a method for forming a cladding layer and a forming apparatus by which a cladding layer is formed by irradiating a base material with a laser beam while supplying a metal powder onto the base material.

A wear-resistant component having wear-resistance improved by forming a cladding layer on a base material has been known. For example, a valve repeatedly comes into contact with an edge of an opened end (hereinafter called an opened-end edge) on a combustion-chamber side of an intake/exhaust port formed in a cylinder head of an engine under a high-temperature environment. Therefore, a wear-resistant valve seat is provided on the opened-end edge of the intake/exhaust port.

This valve seat is manufactured by forming a cladding layer on an opened-end edge of an intake/exhaust port of a cylinder head blank, which is a base material, and then performing a cutting process for the formed cladding layer. Examples of the known method for forming a cladding layer (hereinafter referred to as "a cladding-layer forming method") include the so-called laser cladding method in which a cladding layer is formed by irradiating a base material with a laser beam while supplying a metal powder onto the base material as disclosed in, for example, Japanese Unexamined Patent Application Publication No. 2015-217397.

Note that Non-patent Literature 1 (Kimio Kawakita, Shinichi Taneya, "Introduction to Powder Technology", Plant Engineering Company, published on Oct. 1, 1969, p. 183-199) is mentioned in the explanation of embodiments.

SUMMARY

The inventor has found the following problem in the cladding layer forming method and the forming apparatus by which a cladding layer is formed by irradiating a base material with a laser beam while supplying a metal powder onto the base material.

When an instruction to supply a metal powder is changed to an on-state and hence a supply of the metal powder onto the base material is started, it is necessary to gradually increase laser power according to an increase in an amount of the metal powder that reaches a processed part on the base material. The inventor has found that a time from when the supply instruction is changed to an on-state to when the metal powder reaches the processed part, a time to when the amount of the metal powder in the processed part reaches a steady value, and the like vary depending on the fluidity of the metal powder. Therefore, if the laser output pattern is unchanged even though the fluidity of the metal powder varies, the laser power for the amount of the metal powder that has reached the processed power could be too large or too small. As a result, there is a possibility that variations occur in quality of starting end parts that are the first parts formed in cladding layers.

The present disclosure has been made in view of the above-described circumstance and makes it possible to reduce variations in quality of starting end parts of cladding layers.

An aspect of the present disclosure is a method for forming a cladding layer in which
a cladding layer is formed by starting to supply a metal powder onto a base material by changing a supply instruction to an on-state, and irradiating the metal powder with a laser beam according to a laser output pattern corresponding to the supply instruction, and
the method includes, before forming the cladding layer:
acquiring a fluidity of the metal powder; and
changing the laser output pattern according to the acquired fluidity.

The method for forming a cladding layer according to an aspect of the present disclosure includes, before forming a cladding layer, acquiring a fluidity of a metal powder and changing a laser output pattern according to the acquired fluidity. Therefore, it is possible to keep laser power at an appropriate value for an amount of a metal powder that has reached a processed part even when the fluidity of the metal powder varies. As a result, it is possible to reduce variations in quality of starting end parts of cladding layers.

In the acquiring of the fluidity, the fluidity may be calculated from a bulk density of the metal powder by using a fluidity estimating formula. It is possible to eliminate a trouble of measuring the fluidity and thereby to easily acquire the fluidity.

In the laser output pattern, a time from when the supply instruction is changed to an on-state to when a laser oscillation starts may be increased according to an increase in the fluidity. Further, in the laser output pattern, a time from when a laser oscillation starts to when laser power reaches a maximum value may be increased according to an increase in the fluidity. It is possible to reduce variations in quality of starting end parts of cladding layers even further.

Further, the fluidity may be acquired for each lot of the metal powder. The number of times of acquisition of the fluidity can be reduced.

Another aspect of the present disclosure is an apparatus for forming a cladding layer, including:
a powder supply unit configured to supply a metal powder onto a base material;
a laser oscillator configured to oscillate a laser beam applied to the metal powder; and
a control unit configured to output a supply instruction to the powder supply unit and output a laser output pattern corresponding to the supply instruction to the laser oscillator, in which
a cladding layer is formed by starting to supply the metal powder by changing the supply instruction to an on-state and oscillating the laser beam according to the laser output pattern, and
the control unit:
acquires a fluidity of the metal powder; and
changes the laser output pattern according to the acquired fluidity.

In the apparatus for forming a cladding layer (hereinafter referred to as "the cladding-layer forming apparatus") according to an aspect of the present disclosure, a control unit acquires a fluidity of a metal powder and changes a laser output pattern according to the acquired fluidity. Therefore, it is possible to keep laser power at an appropriate value for an amount of a metal powder that has reached a processed part even when the fluidity of the metal powder varies. As a result, it is possible to reduce variations in quality of starting end parts of cladding layers.

The control unit may calculate the fluidity from a bulk density of the metal powder by using a fluidity estimating formula. It is possible to eliminate a trouble of measuring the fluidity and thereby to easily acquire the fluidity.

In the laser output pattern, a time from when the supply instruction is changed to an on-state to when a laser oscillation starts may be increased according to an increase in the fluidity. Further, in the laser output pattern, a time from when a laser oscillation starts to when the laser power reaches a maximum value may be increased according to an increase in the fluidity. It is possible to reduce variations in quality of starting end parts of cladding layers even further.

Further, the control unit may acquire the fluidity for each lot of the metal powder. The number of times of acquisition of the fluidity can be reduced.

According to the present disclosure, it is possible to reduce variations in quality of starting end parts of cladding layers.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Specific embodiments to which the present disclosure is applied are explained hereinafter in detail with reference to the drawings. However, the present disclosure is not limited to embodiments shown below. Further, the following descriptions and the drawings are simplified as appropriate for clarifying the explanation.

First Embodiment

<Apparatus for Forming Cladding Layer>

Firstly, an apparatus for forming a cladding layer (hereinafter also referred to as a cladding-layer forming apparatus) according to a first embodiment is explained with reference to FIG. 1.

Figure 1:
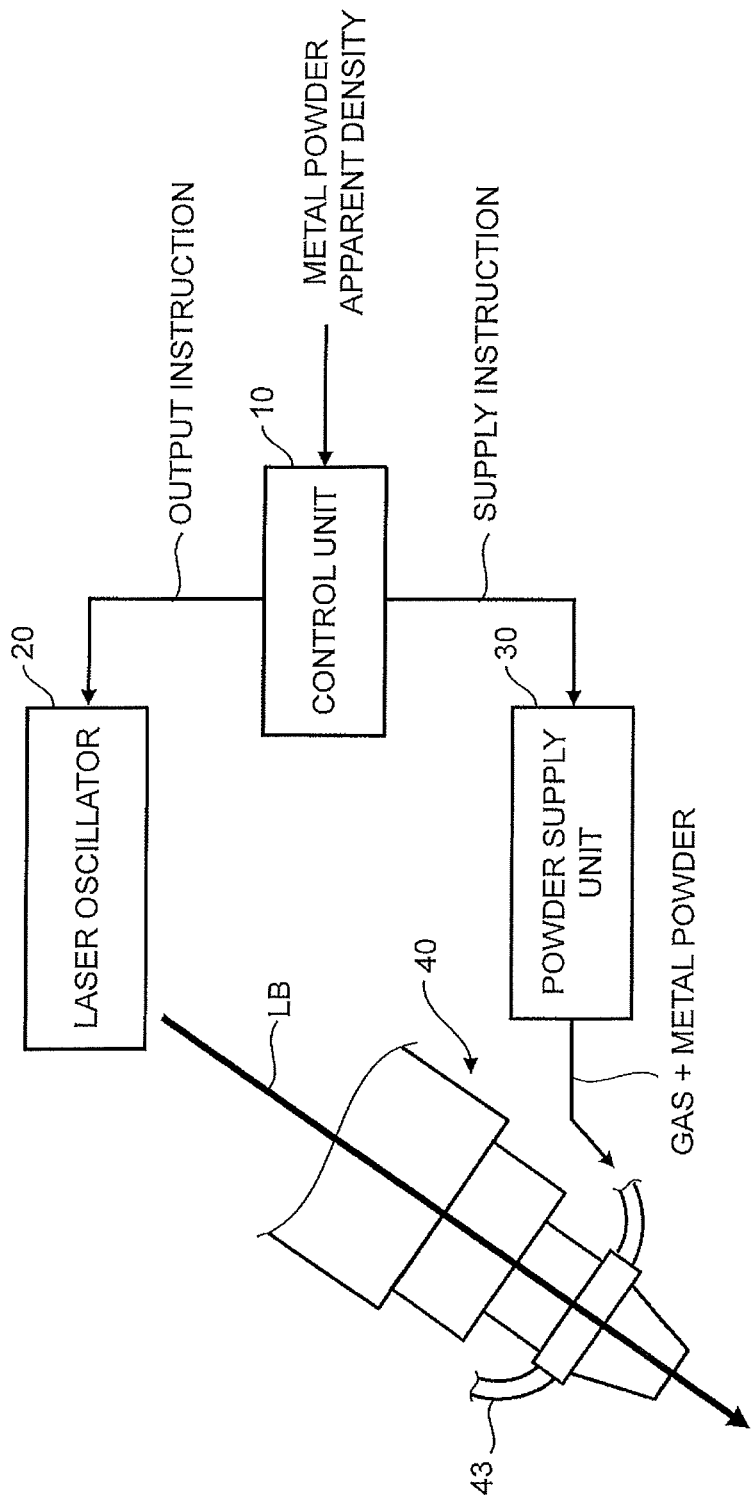
FIG. 1 is a block diagram schematically showing an apparatus for forming a cladding layer according to a first embodiment.

FIG. 1 is a block diagram schematically showing a cladding-layer forming apparatus according to the first embodiment.

As shown in FIG. 1, the cladding-layer forming apparatus according to the first embodiment includes a control unit 10, a laser oscillator 20, a powder supply unit 30, and a laser-process head 40.

Though it is not shown in FIG. 1, the control unit 10 includes, for example, an arithmetic unit such as a CPU (Central Processing Unit) and a storage unit, such as a RAM (Random Access Memory) and a ROM (Read Only Memory), in which various control programs and data are stored.

The control unit 10 outputs a supply instruction to control a supply of a metal powder to the powder supply unit 30. Further, the control unit 10 outputs an output instruction, which is a laser output pattern corresponding to the supply instruction, to the laser oscillator 20. Specifically, the output instruction is a laser output pattern according to which laser power is gradually increased in accordance with an increase in the amount of the metal powder that reaches a processed part on the base material when the supply instruction for the metal powder is changed to an on-state and hence the supply of the metal powder onto the base material is started.

Further, as shown in FIG. 1, a bulk density of a metal powder to be used is input to the control unit 10. The control unit 10 calculates a fluidity of the metal powder from the input bulk density of the metal powder by using a fluidity estimating formula. Then, the control unit 10 changes the output instruction (i.e., the laser output pattern corresponding to the supply instruction) according to the calculated fluidity. Note that how to obtain the fluidity estimating formula used in this embodiment is explained later.

The laser oscillator 20 oscillates (i.e., generates) a laser beam LB having predetermined power based on the output instruction. The laser beam LB is applied to the metal powder supplied to the processed part on the base material through the laser-process head 40.

The powder supply unit 30 stores a raw material, i.e., a metal powder and supplies a predetermined amount of metal powder together with a carrier gas to the laser-process head 40 based on the supply instruction.

As described previously, a time from when the supply instruction is changed to an on-state to when the metal powder reaches the processed part, a time to when the amount of the metal powder in the processed part reaches the maximum value, and the like vary depending on the fluidity of the metal powder. Therefore, if the laser output pattern is unchanged even though the fluidity of the metal powder varies, the laser power for the amount of the metal powder that has reached the processed power could be too large or too small. As a result, there is a possibility that variations occur in quality of starting end parts that are the first parts formed in cladding layers.

To cope with this problem, in the cladding-layer forming apparatus according to this embodiment, the laser output pattern is changed according to the fluidity of a metal powder to be used. Therefore, it is possible to keep the laser power at an appropriate value for an amount of a metal powder that has reached a processed part even when the fluidity of the metal powder varies. As a result, it is possible to reduce variations in quality of starting end parts of cladding layers.

Note that in the cladding-layer forming apparatus according to this embodiment, the fluidity of the metal powder to be used is calculated by using a fluidity estimating formula. However, a measured fluidity of the metal powder to be used may be used.

Further, in the cladding-layer forming apparatus according to this embodiment, the fluidity of the metal powder to be used is calculated from the bulk density of the metal powder to be used by using the fluidity estimating formula. When a metal powder is purchased, the bulk density of the metal powder is printed for each lot of the metal powder in its inspection certificate. Therefore, in the cladding-layer forming apparatus according to this embodiment, it is possible to eliminate a trouble of measuring the fluidity and thereby to easily acquire the fluidity.

Figure 2:
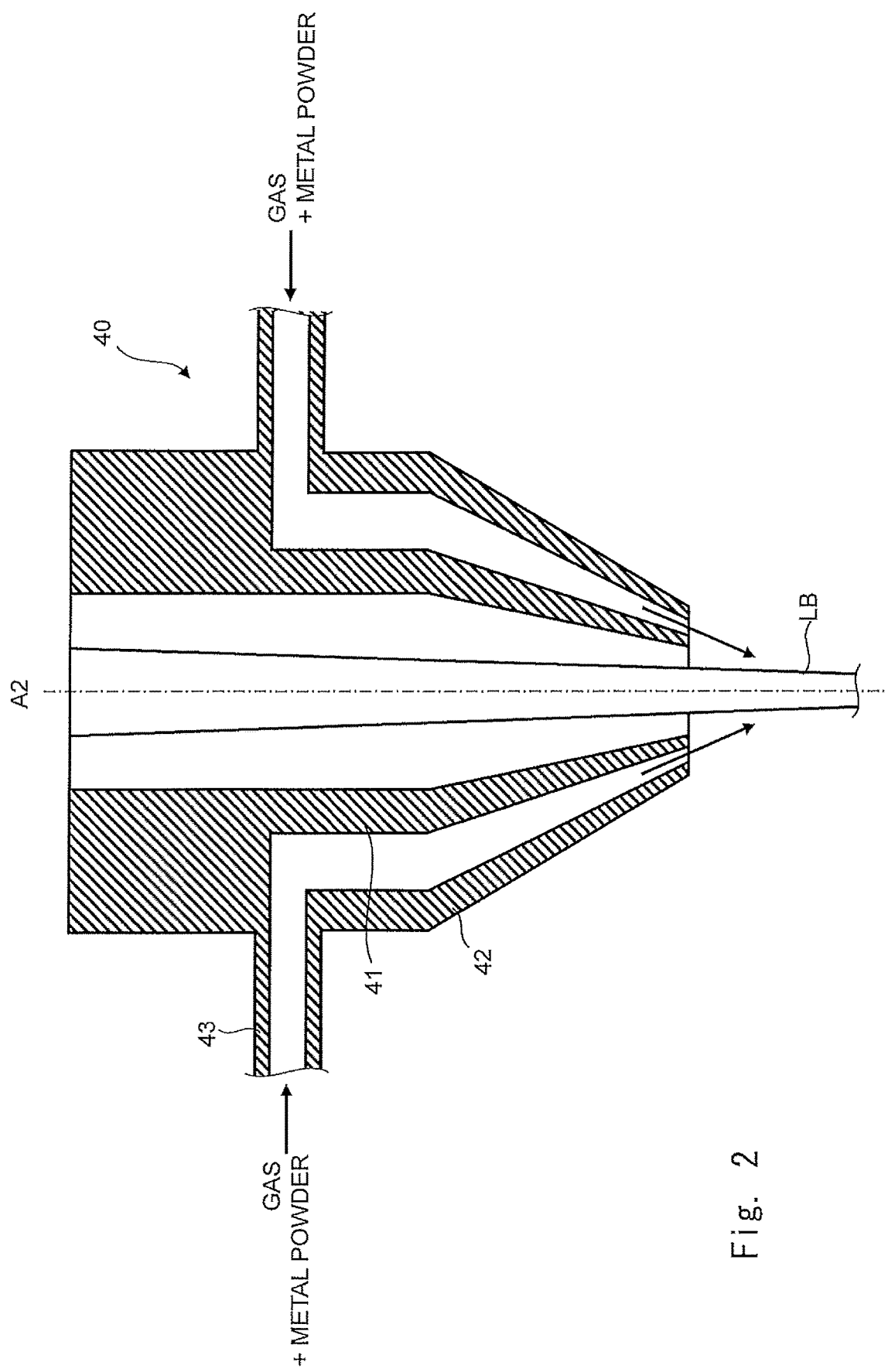
FIG. 2 is a cross section of a laser-process head 40 in the apparatus for forming a cladding layer according to the first embodiment.

Here, FIG. 2 is a cross section of the laser-process head 40 in the cladding-layer forming apparatus according to the first embodiment. Details of a configuration of the laser-process head 40 are explained with reference to FIG. 2. The laser-process head 40 includes an inner nozzle 41, an outer nozzle 42, and a raw-material supplying pipe 43. That is, the laser-process head 40 has a coaxial double-pile structure composed of the inner nozzle 41 and the outer nozzle 42 arranged around a central axis which coincides with an optical axis A2 of the laser beam LB.

Specifically, the laser beam LB is emitted from the inner nozzle 41. Further, a metal powder which is supplied from the powder supply unit 30 through the raw-material supplying pipe 43 is discharged together with a carrier gas from a gap between the inner nozzle 41 and the outer nozzle 42. That is, the discharging axis of the metal powder and the carrier gas coincide with the optical axis A2 of the laser beam LB. Examples of the carrier gas include an inert gas such as an argon gas and a nitrogen gas.

By unifying the irradiation of the laser beam and the supply of the metal powder and the inert gas as described above, the size of the apparatus can be reduced.

<Method for Forming Cladding Layer>

Next, a method for forming a cladding layer (hereinafter also referred to as a cladding-layer forming method) according to the first embodiment is explained with reference to FIGS. 3 to 5. The cladding-layer forming method according to the first embodiment is explained hereinafter by using a valve seat formed in a cylinder head of an engine as an example. However, the cladding-layer forming method according to the first embodiment can be applied to purposes other than the valve seat.

Figure 3:
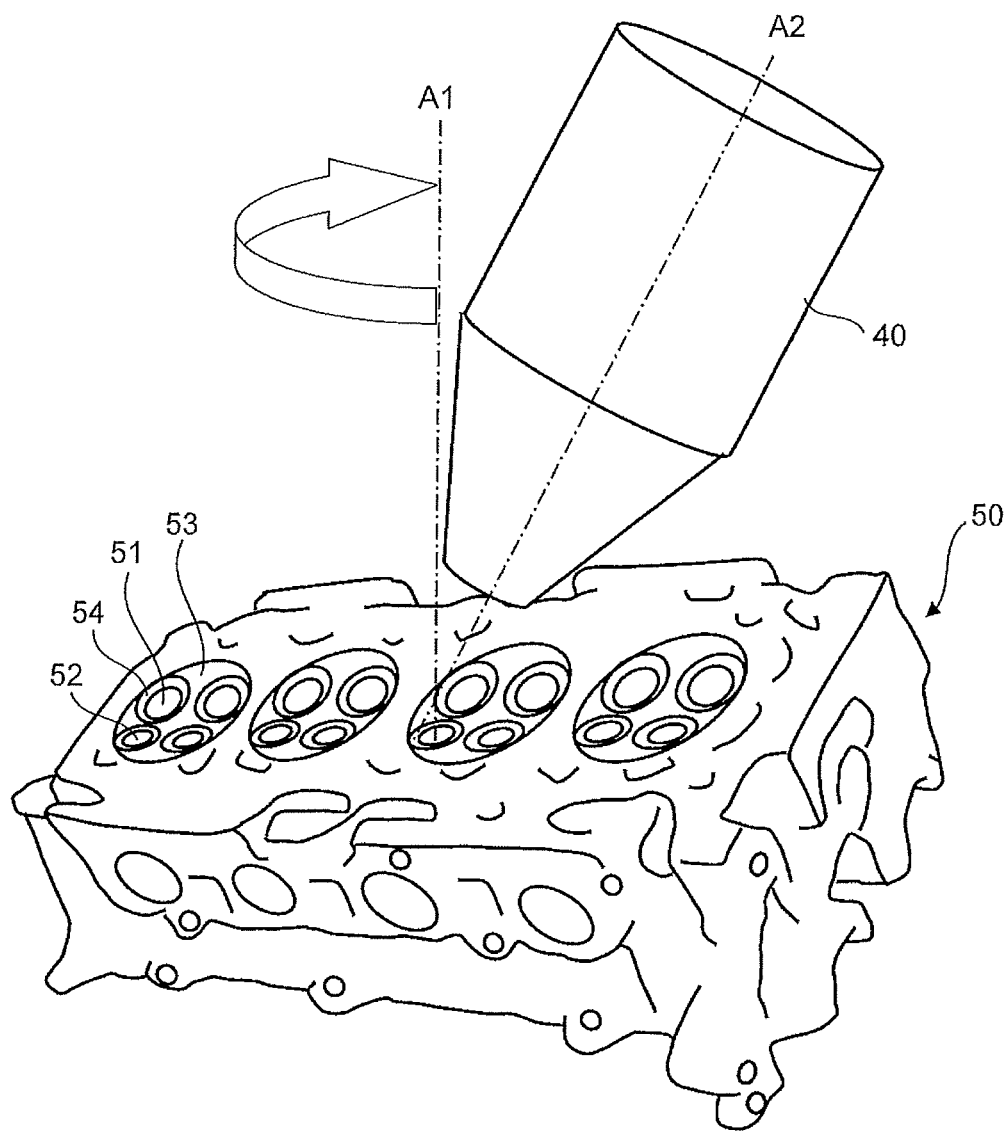
FIG. 3 is a perspective view showing a method for forming a cladding layer according to the first embodiment.

FIG. 3 is a perspective view showing the cladding-layer forming method according to the first embodiment.

Figure 4:
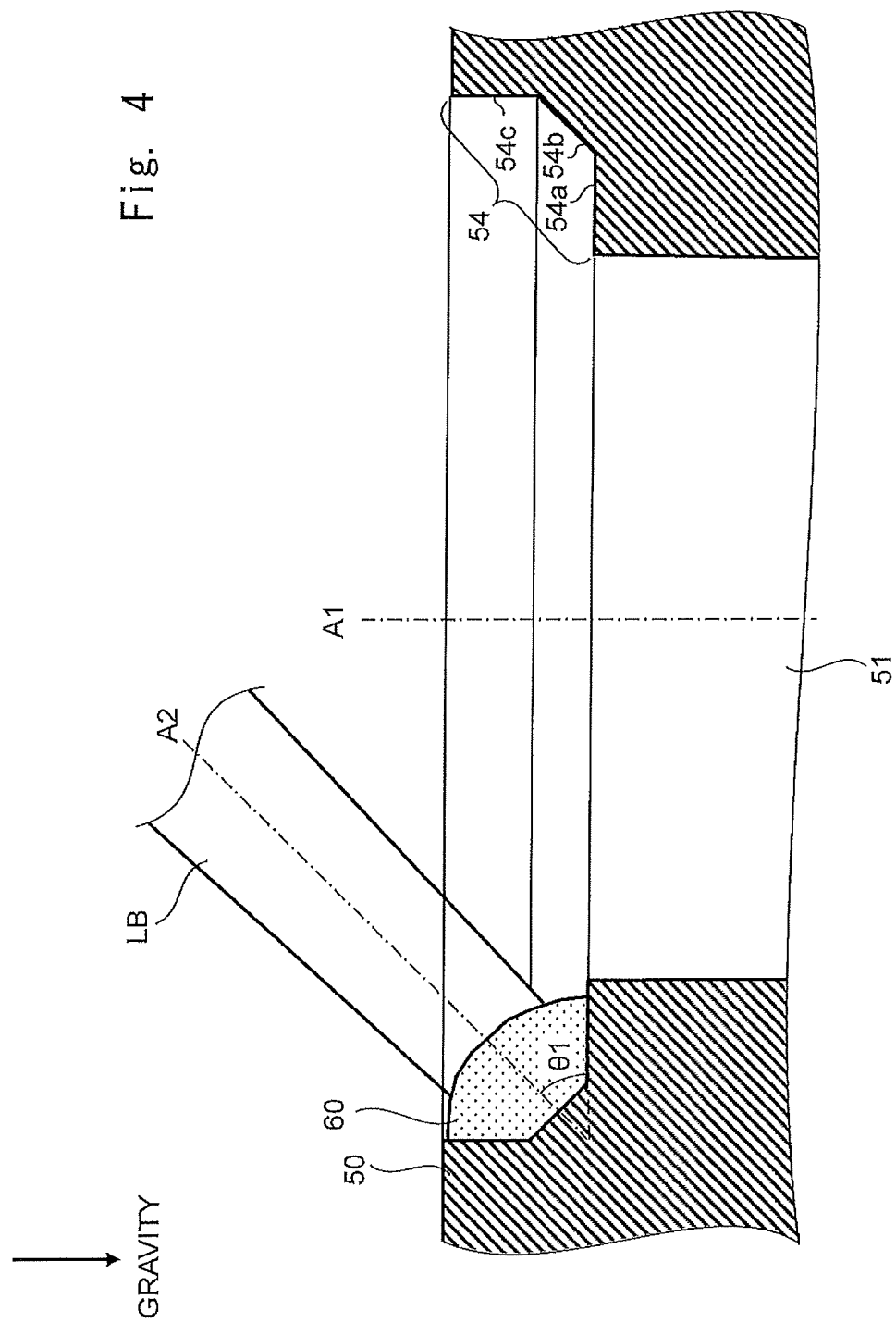
FIG. 4 is a cross section of a processed part showing the method for forming a cladding layer according to the first embodiment.

FIG. 4 is a cross section of a processed part showing the cladding-layer forming method according to the first embodiment.

Figure 5:
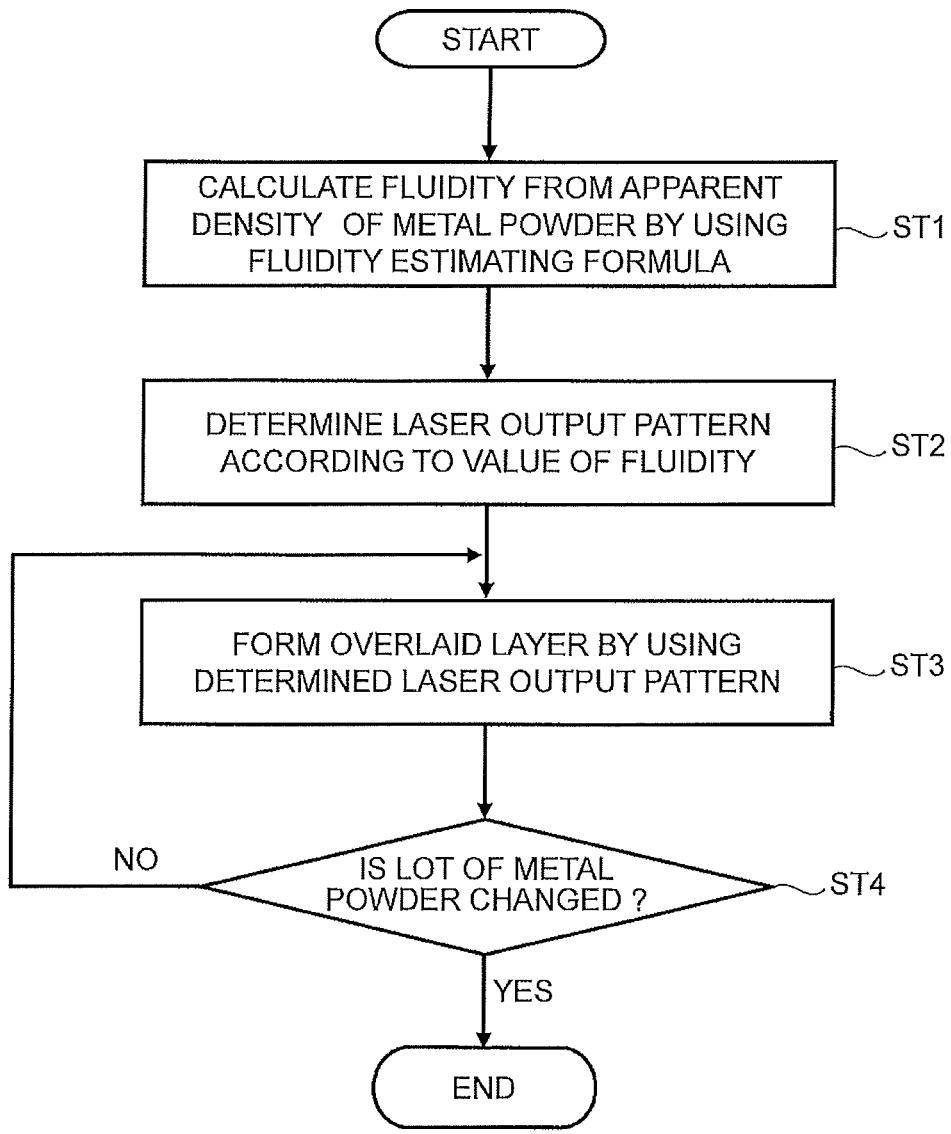
FIG. 5 is a flowchart showing the method for forming a cladding layer according to the first embodiment.

FIG. 5 is a flowchart showing the cladding-layer forming method according to the first embodiment.

Firstly, a configuration of a base material, i.e., a cylinder head blank 50 is explained with reference to FIG. 3. The cylinder head blank 50 is, for example, a cast article made of a cast iron or an aluminum alloy. As shown in FIG. 3, the cylinder head blank 50 includes a plurality of combustion chambers 53. Each combustion chamber 53 includes an intake port 51 and an exhaust port 52. Further, a countersunk groove 54 for forming a cladding layer is formed on an opened-end edge on the combustion chamber 53 side of each of the intake port 51 and the exhaust port 52 by machining.

The cylinder head blank 50 shown in FIG. 3 is a cylinder head blank for a four-cylinder 16-valve engine and each of the four combustion chambers 53 includes two intake ports 51 and two exhaust ports 52. Needless to say, the respective numbers of the combustion chambers 53, the intake ports 51, and the exhaust ports 52 are not limited to those of the example shown in FIG. 3 and are determined as desired.

As shown in FIG. 3, a cladding layer is formed by irradiating the countersunk groove 54 with a laser beam (along an optical axis A2) while supplying a metal powder for the cladding layer to the countersunk groove 54 from the laser-process head 40. The laser-process head 40 turns full circle around a central axis A1 of the ring-shaped countersunk groove 54 so that the cladding layer can be formed along the entire circumference of the countersunk groove 54. The central axis A1 is an axis that passes through the center of the countersunk groove 54 and is perpendicular to the bottom surface of the countersunk groove 54. For each of the intake ports 51 and the exhaust ports 52, the cladding layer is formed after the position of the cylinder head blank 50 is adjusted so that the central axis A1 of the countersunk groove 54 coincides with the vertical axis. Note that in FIG. 3, illustration of the raw-material supplying pipe 43 of the laser-process head 40 is omitted.

The cladding-layer forming method according to the first embodiment is further explained in a more detailed manner with reference to FIG. 4. Note that the cladding-layer forming method on the exhaust port 52 side is similar to that on the intake port 51 side. Therefore, only the cladding-layer forming method on the intake port 51 side is explained.

Firstly, as shown in FIG. 4, a laser beam LB is applied to the ring-shaped countersunk groove 54 formed in the opened-end edge on the combustion chamber 53 side of the intake port 51 while supplying a metal powder to the countersunk groove 54. As a result, the metal powder is melted/solidified inside the countersunk groove 54 and a cladding layer 60 for a valve seat is formed.

Note that as shown in FIG. 3, the laser beam LB (along the optical axis A2) is emitted from the laser-process head 40. Further, the laser-process head 40 turns full circle around the central axis A1 of the ring-shaped countersunk groove 54, so that the cladding layer 60 can be formed along the entire circumference of the countersunk groove 54. As shown in FIG. 4, an inclination angle $\theta 1$ of the optical axis A2 of the laser beam LB is about 45°.

As shown in FIG. 4, the countersunk groove 54 includes a bottom surface 54a, an inclined surface 54b, and a side wall 54c. Further, the countersunk groove 54 is formed by, for example, machining. A failure in the cladding layer 60 tends to occur at a corner of the countersunk groove 54. However, owing to the inclined surface 54b formed between the bottom surface 54a and the side wall 54c, a failure in the cladding layer 60 which would otherwise occur at the corner of the countersunk groove 54 is prevented.

Next, an overall flow of the cladding-layer forming method according to the first embodiment is explained with reference to FIG. 5.

Firstly, as shown in FIG. 5, a fluidity is calculated from a bulk density of a metal powder to be used by using a fluidity estimating formula that is obtained in advance (step ST1). Details of how to obtain the fluidity estimating formula used in the cladding-layer forming method according to this embodiment are explained later.

Next, a laser output pattern corresponding to a supply instruction is determined according to the calculated fluidity (step ST2). That is, the laser output pattern is changed according to the calculated fluidity. Details of the method for determining a laser output pattern corresponding to a supply instruction are explained later.

Next, a cladding layer is formed by using the determined laser output pattern (step ST3). FIGS. 3 and 4, which are explained above, show an aspect in which a cladding layer is formed in the step ST3.

Next, when the lot of the metal powder to be used is not changed (NO at step ST4), the process returns to the step ST3. Then, a cladding layer is formed by using the same laser output pattern. That is, as long as the same lot of the metal powder is used, a cladding layer is repeatedly formed by using the same laser output pattern. Therefore, it is possible to reduce the number of times of calculation of the fluidity. On the other hand, when the lot of the metal powder to be used is changed (YES at step ST4), the process is finished. Then, a process is repeated from the step ST1. That is, for each lot of a metal powder to be used, a fluidity is calculated from a bulk density of the metal powder and the laser output pattern is changed according to the calculated fluidity.

As described above, in the cladding-layer forming method according to this embodiment, before a cladding layer is formed in the step ST3, a fluidity of a metal powder to be used is acquired (step ST1) and a laser output pattern is changed according to the acquired fluidity (step ST2). Therefore, it is possible to keep the laser power at an appropriate value for an amount of a metal powder that has reached a processed part even when the fluidity of the metal powder varies. As a result, it is possible to reduce variations in quality of starting end parts of cladding layers.

<Method for Obtaining Fluidity Estimating Formula>

Next, how to obtain a fluidity estimating formula used for a cladding-layer forming apparatus and a cladding-layer forming method according to this embodiment is explained in detail.

A fluidity estimating formula used for the cladding-layer forming method according to this embodiment was obtained by transforming a Linchevskii equation shown in Non-patent Literature 1 (p. 190) and introducing a constant term into the transformed equation so that it conforms to measured fluidities.

The Linchevskii equation is shown below as Expression (1).

$$W[t/h] = 1.54 \cdot \rho_B[t/m^3] \cdot D_0^{2.5} \text{ [mm]} \times 10^{-4} \quad \text{Expression (1)}$$

In the expression: W is a weight outflow speed; $\rho_B$ is a bulk density of particles; and $D_0$ is an orifice diameter.

Firstly, a transformation of Expression (1) into a fluidity estimating formula is explained.

Because of "1 [t/h]=278 [g/s]" and "1 [t/m³]=1 [g/cm³]", the following Expression (2) is obtained by converting Expression (1) in terms of the unit.

$$W[g/s] = 428 \cdot \rho_B[g/cm^3] \cdot D_0^{2.5} \text{ [mm]} \times 10^{-4} \quad \text{Expression (2)}$$

Therefore, it is possible to estimate a fluidity [s/50 g] in a fluidity measurement method in conformity with JIS Z2502 by using the following Expression (3).

$$\text{Fluidity [s/50 g]} = 50[g]/W[g/s] =$$
$$50[g]/(428 \cdot \rho_B[g/cm^3] \cdot D_0^{2.5} \text{[mm]} \times 10^{-4}) = \quad \text{Expression (3)}$$
$$1169/(\rho_B[g/cm^3] \cdot D_0^{2.5} \text{[mm]})$$

Since the orifice diameter is specified to 2.5 mm in the JIS Z2502, $D_0$ is 2.5 ($D_0$=2.5) in Expression (3). Therefore, by using Expression (3), it is possible to estimate the fluidity [s/50 g] based solely on the bulk density $\rho_B$ of particles.

Further, measured fluidities were compared with fluidities estimated by Expression (3) for three types of raw-material metal powders A, B and C having different loose bulk densities $\rho_B$. To make the metal powders A, B and C have different loose bulk densities $\rho_B$, their particle diameter was adjusted by sieving. Table 1 shows measured fluidities [s/50 g], bulk densities $\rho_B$ [g/cm³], chemical constituents [mass %], and average particle diameters [μm] of the metal powders A, B and C.

The fluidities [s/50 g] were measured by using a fluidity measurement method in conformity with JIS Z2502. The average particle diameters [μm] were measured by using a sieving test method in conformity with JIS Z8815. Further, a cumulative undersize 50% was used as an average particle diameter.

TABLE 1

| Metal powder | Fluidity (s/50 g) | Loose bulk density (g/cm³) | Chemical constituent (mass %) | | | | | | | Average particle diameter (μm) |
|---|---|---|---|---|---|---|---|---|---|---|
| | | | Cu | Ni | Si | Fe | Mo | Co | Cr | |
| A | 19.0 | 4.10 | 77 | 12 | 3 | 4 | 0 | 3 | 1 | 81 |
| B | 15.4 | 4.89 | 2 | 22 | 5 | 12 | 40 | 15 | 4 | 140 |
| C | 16.3 | 4.56 | 64 | 18 | 3 | 9 | 6 | 0 | 0 | 80 |

Figure 6:
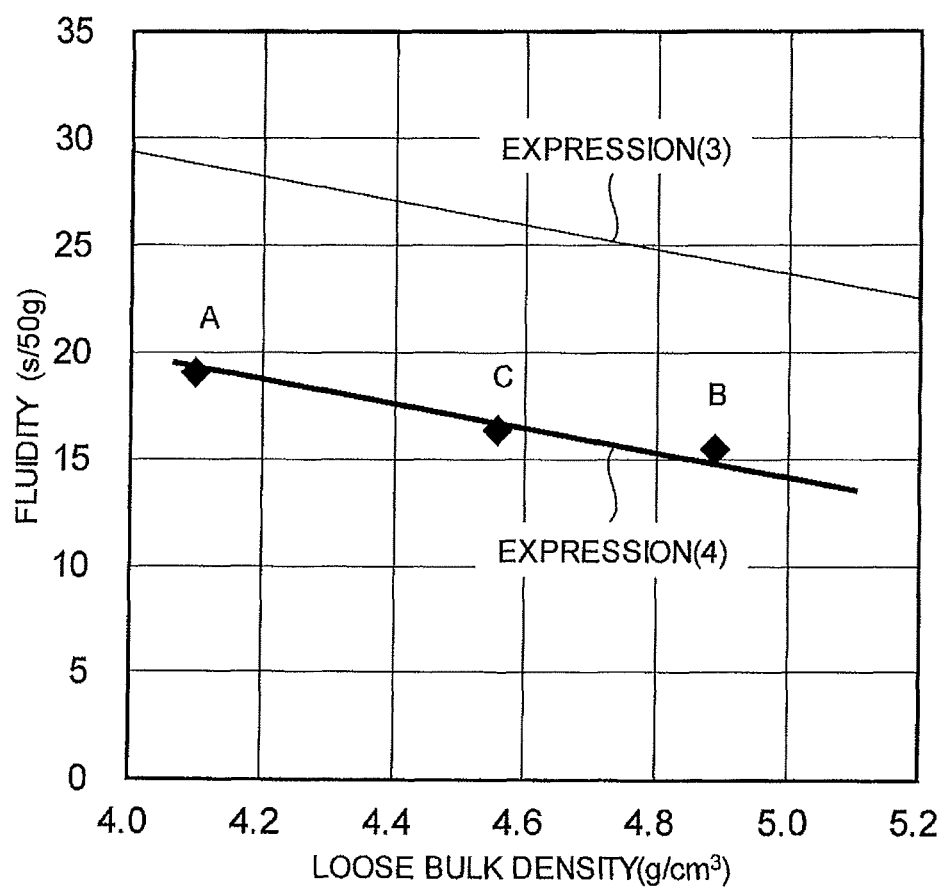
FIG. 6 is a graph for comparing measured fluidities and fluidities estimated by Expression (3)

FIG. 6 is a graph for comparing measured fluidities and fluidities estimated by Expression (3). As shown in FIG. 6, the fluidities estimated by Expression (3) are widely different from the measured fluidities, indicating that Expression (3) cannot be used as it is as a fluidity estimating formula. However, as shown in FIG. 6, differences between the fluidities estimated by Expression (3) and the measured fluidities are constant.

Therefore, a fluidity estimating formula used for the cladding-layer forming method according to this embodiment can be expressed as the below-shown Expression (4) that is obtained by introducing a constant term "a" into Expression (3) so that the obtained expression conforms to measured fluidities.

$$\text{Fluidity [s/50 g]} = 1169/(\rho_B[g/cm^3] \cdot D_0^{2.5} \text{ [mm]}) + a \quad \text{Expression (4)}$$

The constant term "a" is determined in advance by an experiment like the one shown in the graph in FIG. 6. Therefore, by using Expression (4), it is possible to estimate the fluidity [s/50 g] based solely on the bulk density $\rho_B$ of a metal powder used as a raw material. Further, when a metal powder is purchased, the bulk density $\rho_B$ of the metal powder is printed for each lot of the metal powder in its inspection certificate. Therefore, it is unnecessary to measure the bulk density when the metal powder is used. Therefore, in the cladding-layer forming apparatus and the cladding-layer forming method according to this embodiment, it is also possible to eliminate a trouble of measuring the bulk density of a metal powder and thereby to easily and accurately estimate the fluidity just by performing calculation using Expression (4).

<Method for Determining Laser Output Pattern>

Next, a method for determining a laser output pattern corresponding to a supply instruction is explained with reference to FIGS. 7 to 9.

Figure 7:
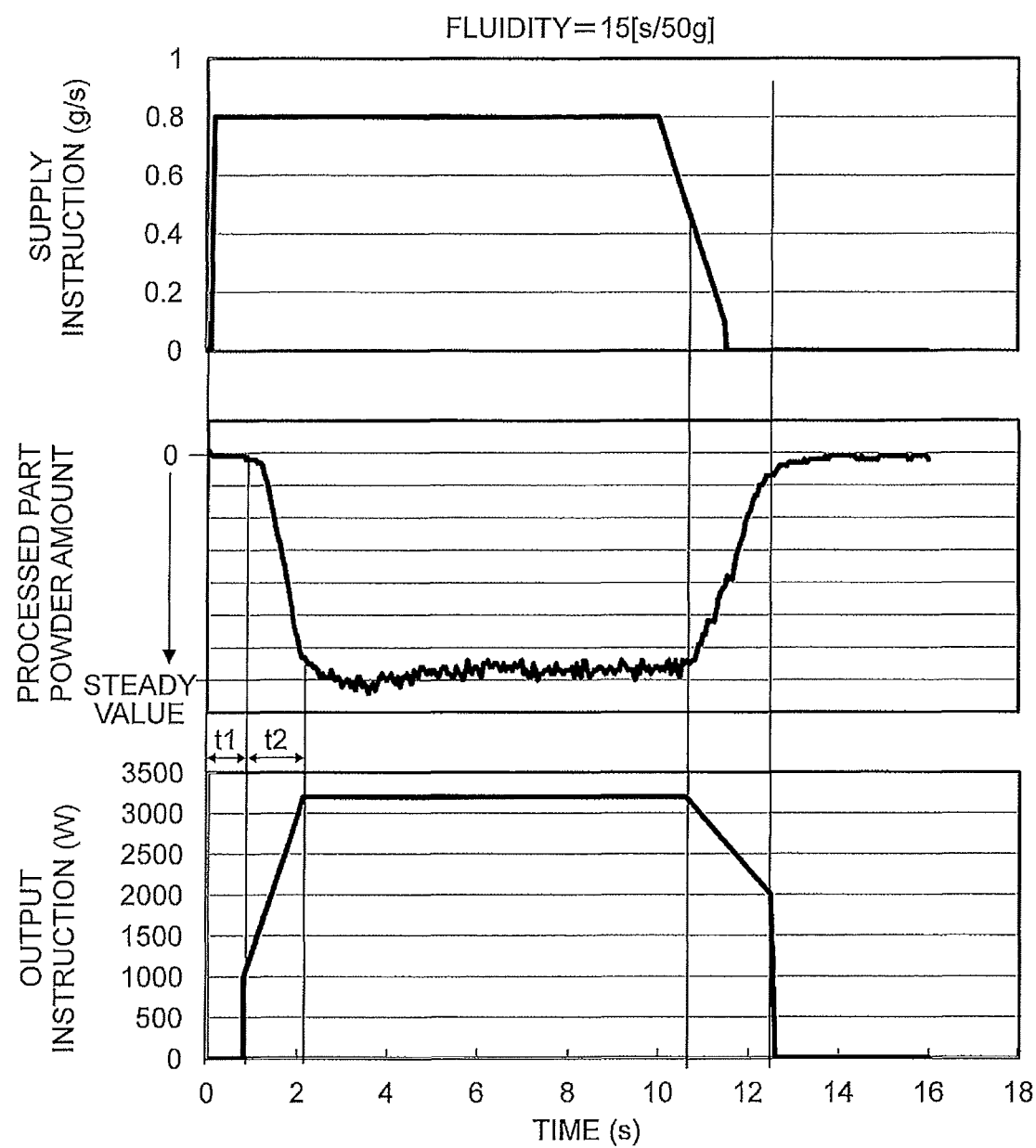
FIG. 7 is a graph showing a relation between a supply instruction and a laser output pattern (an output instruction) when a fluidity of a metal powder is 15 [s/50 g]

FIG. 7 is a graph showing a relation between a supply instruction and a laser output pattern (an output instruction) when a fluidity of a metal powder is 15 [s/50 g].

Figure 8:
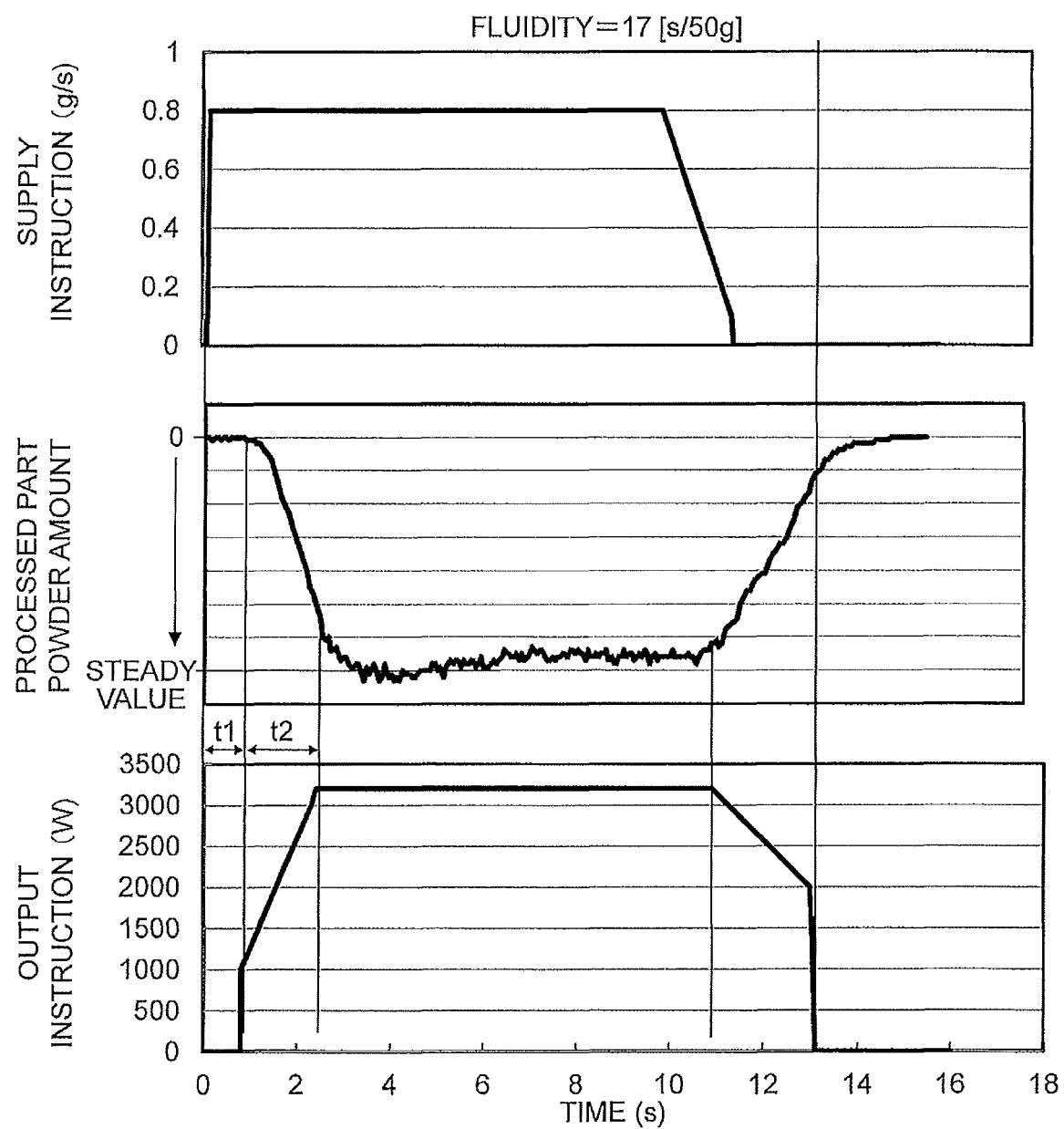
FIG. 8 is a graph showing a relation between a supply instruction and a laser output pattern (an output instruction) when a fluidity of a metal powder is 17 [s/50 g]

FIG. 8 is a graph showing a relation between a supply instruction and a laser output pattern (an output instruction) when a fluidity of a metal powder is 17 [s/50 g].

Figure 9:
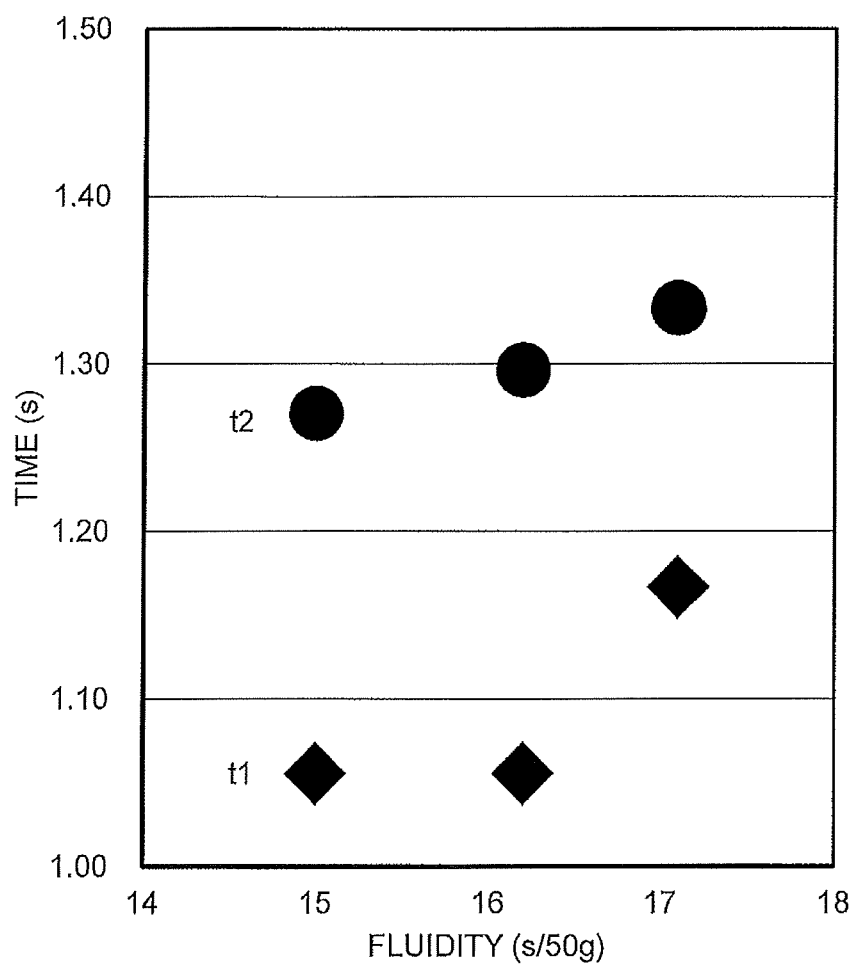
FIG. 9 is a graph showing dependence of a time t1 from when a supply instruction is changed to an on-state to when a metal powder starts to reach a processed part on fluidity, and dependence of a time t2 from when the metal powder starts to reach the processed part to when an amount of the metal powder reaches a steady value on fluidity.

FIG. 9 is a graph showing dependence of a time t1 from when a supply instruction is changed to an on-state to when a metal powder starts to reach a processed part on fluidity, and dependence of a time t2 from when the metal powder starts to reach the processed part to when an amount of the metal powder reaches a steady value on fluidity.

In each of FIGS. 7 and 8, a supply instruction [g/s], an amount of powder in a processed part (hereinafter also referred to as "processed-part powder amount"), and an output instruction [W] (a laser output pattern) are shown in an upper part, a middle part, and a lower part, respectively. The horizontal axis indicates a time [s] in each graph, and is in common in these graphs. Further, the graph of the supply instruction shown in the upper part in FIG. 8 is the same as the graph shown in the upper part in FIG. 7. The processed-part powder amounts shown in the middle part are values measured by a sensor. Further, the output instruction (the laser output pattern) shown in the lower part are created based on the processed-part powder amount.

As understood from a comparison between FIGS. 7 and 8, when the fluidity increases from 15 [s/50 g] to 17 [s/50 g], the time t1 from when the supply instruction is changed to an on-state to when the metal powder starts to reach the processed part increases. Therefore, in accordance with this increase, the time from when the supply instruction is changed to an on-state in the output instruction [W] (the laser output pattern) to when a laser oscillation starts also increases. FIG. 9 shows the time t1 when the fluidity is 16 in addition to the time t1 when the fluidity is 15 [s/50 g] and that when the fluidity is 17 [s/50 g] shown in FIGS. 7 and 8, respectively.

Similarly, when the fluidity increases from 15 [s/50 g] to 17 [s/50 g], the time t2 from when the metal powder starts to reach the processed part to when the amount of the metal powder reaches a steady value increases. Therefore, in accordance with this increase, the time from when the laser oscillation starts in the output instruction [W] (the laser output pattern) to when the laser output reaches a maximum value also increases. FIG. 9 shows the time t2 when the fluidity is 16 in addition to the time t2 when the fluidity is 15 [s/50 g] and that when the fluidity is 17 [s/50 g] shown in FIGS. 7 and 8, respectively.

As described above, the laser output pattern corresponding to the supply instruction is changed according to the fluidity of the metal powder. Further, it is preferable to create laser output patterns for different fluidities as shown in FIGS. 7 and 8 in advance and store them in a storage unit of the control unit 10 shown in FIG. 1. Then, a laser output pattern is selected according to the fluidity of a metal powder to be used. By the above-described configuration, it is possible to continue forming a cladding layer without being interrupted even when the laser output pattern is changed according to the fluidity of the metal powder.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method for forming a cladding layer wherein
a cladding layer is formed by starting to supply a metal powder onto a base material by changing a supply instruction to an on-state, and irradiating the metal powder with a laser beam according to a laser output pattern corresponding to the supply instruction, and
the method includes, before forming the cladding layer:
acquiring a fluidity of the metal powder; and
changing the laser output pattern according to the acquired fluidity.

2. The method for forming a cladding layer according to claim 1, wherein in the acquiring of the fluidity, the fluidity is calculated from a bulk density of the metal powder by using a fluidity estimating formula.

3. The method for forming a cladding layer according to claim 1, wherein in the laser output pattern, a time from when the supply instruction is changed to an on-state to when a laser oscillation starts is increased according to an increase in the fluidity.

4. The method for forming a cladding layer according to claim 1, wherein in the laser output pattern, a time from when a laser oscillation starts to when laser power reaches a maximum value is increased according to an increase in the fluidity.

5. The method for forming a cladding layer according to claim 1, wherein the fluidity is acquired for each lot of the metal powder.

6. An apparatus for forming a cladding layer, comprising:
a powder supply unit configured to supply a metal powder onto a base material;
a laser oscillator configured to oscillate a laser beam applied to the metal powder; and
a control unit configured to output a supply instruction to the powder supply unit and output a laser output pattern corresponding to the supply instruction to the laser oscillator, wherein
a cladding layer is formed by starting to supply the metal powder by changing the supply instruction to an on-state and oscillating the laser beam according to the laser output pattern, and
the control unit:
acquires a fluidity of the metal powder; and
changes the laser output pattern according to the acquired fluidity.

7. The apparatus for forming a cladding layer according to claim 6, wherein the control unit calculates the fluidity from a bulk density of the metal powder by using a fluidity estimating formula.

8. The apparatus for forming a cladding layer according to claim 6, wherein in the laser output pattern, a time from when the supply instruction is changed to an on-state to when a laser oscillation starts is increased according to an increase in the fluidity.

9. The apparatus for forming a cladding layer according to claim 6, wherein in the laser output pattern, a time from when a laser oscillation starts to when laser power reaches a maximum value is increased according to an increase in the fluidity.

10. The apparatus for forming a cladding layer according to claim 6, wherein the control unit acquires the fluidity for each lot of the metal powder.

* * * * *